United States Patent Office 3,548,019
Patented Dec. 15, 1970

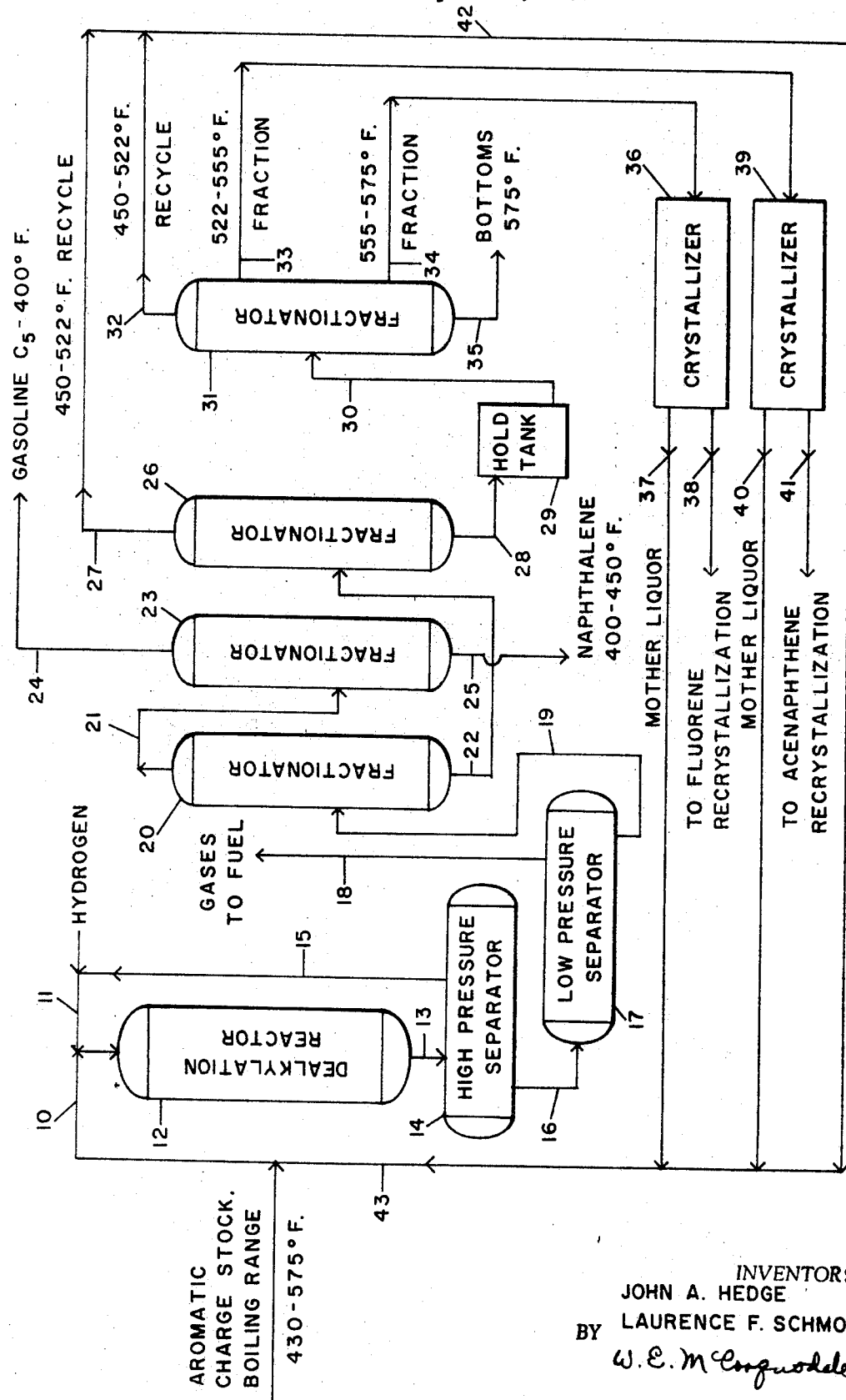

3,548,019
PROCESS FOR THE PRODUCTION OF
NAPHTHALENE
John A. Hedge, Devon, Wilmington, and Laurence F. Schmoyer, Newark, Del., assignors to Sun Oil Company, Philadelphia, Pa., a corporation of New Jersey
Filed Apr. 22, 1968, Ser. No. 723,106
Int. Cl. C07c 5/22, 7/00, 3/58
U.S. Cl. 260—672
5 Claims

ABSTRACT OF THE DISCLOSURE

An improved yield of naphthalene is obtained from an aromatic concentrate from catalytic gas oil, said concentrate distilling in the range of 430–575° F., by hydrodealkylation followed by separation of the products into fractions including those distilling in the range of 400–450° F. containing naphthalene, 522–555° F. fraction rich in acenaphthene and a 555–575° F. fraction rich in fluorene followed by crystallization and separation of acenaphthene and fluorene from their mother liquors and recycling the mother liquors along with other alkylnaphthalene-containing fractions to the hydrodealkylation reactor for conversion to naphthalene.

BACKGROUND OF THE INVENTION

This invention relates to a process for increasing the yield of naphthalene in the hydrodealkylation of an aromatic concentrate from catalytic gas oil, said concentrate distilling in the range of 430–575° F.

It is well known that alkylnaphthalenes derived from cracked petroleum hydrocarbons such as cycle stocks or the bottoms obtained in heavy naphtha reforming can be hydrodealkylated to yield naphthalene. These stocks usually contain some alkylbenzenes in addition to naphthalene. Suitable processes for the hydrodealkylation of aromatic concentrates from cycle stock have been described by Mason in U.S. Pat. 3,150,196 and by Calkins in U.S. Pat. 3,177,262.

The preferred charge stock for the production of naphthalene by hydrodealkylation is a desulfurized aromatic concentrate containing less than ten percent saturated hydrocarbons prepared by solvent extraction of catalytic gas oils boiling in the range of 430–522° F. A process for preparing such a charge stock has been described by Hagerty et al. in U.S. Pat. 3,172,919. In this process furfural typically is used as the solvent. Other solvents selective for the extraction of aromatics such as sulfur dioxide, dimethylsulfoxide, etc., may also be used. Further, a suitable aromatic concentrate can be prepared by selective adsorption with silica gel. In addition suitable charge stocks can be prepared by using blends of the above-described aromatic concentrates and a gas oil fraction containing 85–90 percent aromatics distilling in the range of 430–522° F. prepared by high temperature catalytic cracking. Heretofore aromatic concentrates in the 522–575° F. range generally have been excluded from the hydrodealkylation charge stock for the production of naphthalene even though aromatics in this boiling range are largely alkylnaphthalenes. The principal reason that high boiling alkylnaphthalenes have not been included in hydrodealkylation feedstocks has been the accumulation in the recycle stock of materials in the 522–575° F. range which result in a reduction in naphthalene yield and an increase in cost.

In order to obtain naphthalene with a low sulfur content it is necessary that the charge stocks to the hydrodealkylation reactor be essentially free of sulfur-containing compounds. Hydrodesulfurization of the sulfur-containing compounds can be readily accomplished using catalysts containing the oxides or sulfides of nickel, cobalt, molybdenum and tungsten on alumina. For example, cobalt molybdate, nickel molybdate, cobalt tungstate, nickel tungstate or mixtures thereof and the corresponding thiomolybdates or thiotungstates are suitable hydrodesulfurization catalysts. Reaction conditions for hydrodesulfurization are: temperature—800–1000° F., pressure—150–1000 p.s.i.g. with a range of 200–500 p.s.i.g. preferred, a hydrogen-to-hydrocarbon mole ratio of 3:1 to 25:1 with a range of 5:1 to 15:1 preferred, and a liquid hourly space rate of 0.2 to 10 volumes of charge stock per volume of catalyst per hour.

Reaction conditions for the production of naphthalene by the hydrodealkylation of the alkylnaphthalenes present in a catalytic gas oil aromatic concentrate are as follows: temperature—1100–1350° F., pressure—150–1000 p.s.i.g. with a range of 200–500 p.s.i.g. preferred, a hydrogen-to-hydrocarbon mole ratio in the range of 5:1 to 25:1, hydrogen purity at least 40 mole percent, a recycle gas rate of 2000–12,000 s.c.f. per barrel and a residence time in the thermal hydrodealkylator of 8–40 seconds. The dealkylation conditions are correlated to give a per pass conversion of at least fifty percent of the alkylnaphthalenes to naphthalene. The effluent from the dealkylation zone is distilled into a series of fractions: (1) the first fraction distills below 400° F. and consists mainly of benzene and alkylbenzenes, (2) a 400–450° F. fraction containing essentially pure naphthalene, (3) a 450–522° F. fraction suitable as a recycle stock to the dealkylation zone and (4) a higher boiling fraction unsuitable as recycle stock to the dealkylation zone because of its refractory nature. The higher boiling fraction has heretofore been used as fuel or as a charge stock of the production of carbon black. Attempts to use charge stocks boiling in the range of 430–575° F. and recycle of the product boiling in the 522–575° F. range have resulted in a build up of refractory materials in this boiling range and a reduction in the capacity of the plant to produce naphthalene.

BRIEF DESCRIPTION OF THE DRAWING

The accompanying drawing is a schematic flowsheet illustrating the process of the invention whereby improved yields of naphthalene are secured while also acenaphthene and fluorene are obtained as additional products.

DESCRIPTION OF THE INVENTION

The invention provides a process for treating the hydrodealkylation product distilling in the 522–575° F. range whereby a portion of the product can be recycled to the dealkylation zone for the production of naphthalene instead of being discarded for use as fuel. To effect this process improvement the hydrodealkylation product distilling above 522° F. is separated into a 522–555° F. fraction, a 555–575° F. fraction and a bottoms fraction. Acenaphthene is separated from the 522–555° F. fraction by crystallization, fluorene is separated from the 555–575° F. fraction by crystallization and either or both of the mother liquors from the recovery of acenaphthene and fluorene can be recycled to the hydrodealkylation reactor with other fractions containing alkylnaphthalenes for conversion to naphthalene. The mother liquors after the recovery of acenaphthene and fluorene are composed mainly by alkylnaphthalenes and are excellent charge stocks for the production of naphthalene.

Naphthalene, acenaphthene and fluorene are well-known organic chemicals that are useful as intermediates in the production of organic acids, dyes and insecticides. Previously acenaphthene and fluorene have been recovered from coal tar distillates or prepared by synthetic methods. Suld in U.S. Pat. 3,325,551 has described the preparation of fluorene from o-methylbiphenyl by cyclodehydrogenation at elevated temperatures using a modified platinum-on-alumina catalyst. The preparation of fluorene from o-methylbiphenyl is also described by Orchin in U.S. Pat. 2,414,118.

We have discovered that substantial amounts of acenaphthene and fluorene are present in the hydrodealkylation product distilling in the 522–575° F. range due to the failure of the $C_5$ rings in these compounds to cleave under the conditions of hydrodealkylation required to remove alkyl groups from the naphthalene nucleus. Also, we have discovered that acenaphthene and fluorene can be selectively crystallized from the 522–555° F. and 555–575° F. fractions. Heretofore suitable methods of recovering significant amounts of these materials from petroleum sources have not been described in the art. In addition we have discovered that the mother liquors from the crystallization of acenaphthene and fluorene are alkylnaphthalenes good for recycling to the dealkylation reactor.

The invention is described more specifically in conjunction with the drawing, a schematic flowsheet, illustrating the present process for producing naphthalene, acenaphthene, and fluorene from an aromatic concentrate derived from catalytic gas oil boiling in the range of 430–575° F. The fresh charge stock which enters the system through line 10 is a desulfurized aromatic concentrate containing alkylnaphthalenes, alkylbenzenes, other high boiling aromatic compounds and only a small amount, e.g., less than 10 percent of saturated hydrocarbons. For example, a preferred stock may contain 75 percent alkylnaphthalenes, 10 percent alkylbenzenes, 10 percent other high boiling aromatic compounds and 5 percent saturated hydrocarbons. The composition of a typical fresh charge stock is given in Table I.

Liquid product from the lower pressure separator passes through line 19 to fractionator 20 in which gasoline and naphthalene are separated and pass overhead through line 21 to fractionator 23 from which a $C_5$–400° F. gasoline fraction is collected overhead through line 24. The gasoline fraction is composed primarily of aromatics and is an excellent blending stock for high octane gasoline. Naphthalene is taken from line 25 as a fraction distilling in the 400–450° F. range. Typically this fraction is composed mainly of naphthalene and has a freezing point of 78.6° C. and a sulfur content of about 0.05 percent.

The bottoms fraction from fractionator 20 amounting to 40–50 percent of the charge stock to dealkylation zone 12 passes through line 22 to fractionator 26 where an overhead fraction consisting mainly of methyl and dimethylnaphthalenes and distilling in the range of 450–522° F. is taken through line 27 and recycled via lines 42, 43 and 10 as part of the charge stock to the dealkylation reactor 12. Product distilling above 522° F. passes as a bottoms fraction through line 28 to hold tank 29 from which it passes through line 30 to fractionator 31 where any material distilling below 522° F. is collected overhead through line 32 as first fraction and combined with recycle stock in line 42. A second fraction distilling in the range of 522–555° F. is collected through line 33 and charged to crystallizer 39 held at 70–80° F. from which solid acenaphthene of about 95 percent purity is recovered through line 41. Recrystallization from ethanol increases the purity to 99+ percent acenaphthene. The mother liquor from crystallizer 39 and subsequent recrystallization consist mainly of alkylnaphthalenes and pass through lines 40, 43 and 10 for return to the hydrodealkylation reactor. From column 31 a third fraction distilling in the range of 555–575° F. is taken via line 34 and passes to crystallizer 36 where crude fluorene is separated at 70–80° F. in 70–75 percent purity through line 38. The major impurity in the crude fluorene is 5,6-benzindane which can be at least partly removed by recrystallization from methanol, typically giving fluorene product 90% purity. The mother liquor from crystallizer 36 and that from the methanol recrystallization contain alkylnaphthalenes which can be passed through lines 37, 43 and 10 for recycle to the hydrodealkylation reactor. Product removed from the bottom of fractionator 31 by means of line 35 distills above 575° F. and is sent to fuel. This fraction consists of polymeric materials formed as by-product in the hydrodealkylation reaction. By maintaining the hydrogen purity in

TABLE I.—DEMETHYLATOR CHARGE STOCK

| Hydrocarbon type | Below $C_{10}$ | $C_{10}$ | $C_{11}$ | $C_{12}$ | $C_{13}$ | $C_{14}$ | $C_{15}$ | Total |
|---|---|---|---|---|---|---|---|---|
| Alkylbenzenes | 6.9 | 1.1 | 0.8 | 0.6 | 0.7 | 0.6 | 0.4 | 11.1 |
| Indanes and tetralins | 0.3 | 0.7 | 3.1 | 5.8 | 3.1 | 1.0 | 0.3 | 14.3 |
| Indenes | | | | | 0.6 | 0.3 | 0.1 | 1.0 |
| Naphthalenes | | 0.9 | 13.4 | 31.8 | 14.2 | 2.1 | 0.3 | 62.7 |
| Biphenyls | | | | 0.6 | 0.6 | 0.4 | 0.3 | 1.9 |
| Acenaphthenes | | | | 0.7 | 1.2 | 0.6 | 0.3 | 2.8 |
| Fluorenes | | | | | 0.3 | 0.1 | | 0.4 |
| Nitrogen compounds ($C_nH_{2n-9}N$) | 0.2 | 0.3 | 0.2 | | | | | 0.7 |
| Nonaromatics | 0.4 | 2.0 | 1.2 | 0.5 | 0.5 | 0.4 | 0.1 | 5.1 |
| Total | 7.8 | 5.0 | 18.7 | 40.0 | 21.2 | 5.5 | 1.8 | 100 |

The fresh charge stock together with recycle stock is heated and vaporized (by means not shown) and the vapor is mixed with hydrogen from line 11 before passing to the dealkylation reactor 12 maintained at a temperature above 1000° F., preferably about 1125–1325° F. and under a pressure of about 200–800 p.s.i.g. Other reaction conditions for this dealkylation step include a hydrogen-to-oil mole ratio of about 5:1 to 10:1 and a residence time of about 8–40 seconds sufficient to effect dealkylation of typically 40–60 percent of the alkyl aromatic hydrocarbons in the charge.

The effluent from the dealkylation reactor passes through line 13 to a high pressure separator 14 from which hydrogen is separated through line 15 and recirculated to the dealkylation reactor and the liquid product passes through line 16 to a low pressure separator 17 from which gases are vented to fuel through line 18.

the recycle gas at 50 mole percent or greater during hydrodealkylation, the polymer can be reduced to a relatively small amount.

Data presented in Table II are illustrative of hydrodealkylation runs and include the consolidation of plant data and laboratory data. It will be noted that the fractions of bottoms collected such as from fractionator 26 are about 12 percent of the fresh stock charged and that 35–50 percent of this total bottoms material is suitable recycle stock for hydrodealkylation when the acenaphthene, fluorene and product distilling above 575° F. have been removed. The recovery of these alkylnaphthalenes for hydrodealkylation would, in a commercial operation, represent a significant increase in the yield of naphthalene available from gas oil aromatics. In addition, 1–3 percent based on fresh charge stock of pure acenaphthene and 1–3 percent based on fresh charge stock of fluorene of 80-90 percent purity can be recovered. Although the fluorene may be contaminated with a minor amount of 5,6-benzindane, hydrogenation of the mixture to the corresponding perhydro compounds results in an excellent charge stock for preparing trimethyladamantane by isomerization as described in Schneider U.S. Pat. No. 3,128,-316.

TABLE II.—HYDRODEALKYLATION OF AROMATIC CONCENTRATES FROM CATALYTIC GAS OIL [1]

| Reaction conditions: | | |
|---|---|---|
| Temperature, °F | 1,230 | 1,250 |
| Charge rate, lbs./hr | 51,828 | 58,000 |
| Hydrogen recycle rate, scf./b | 3,000 | 3,000 |
| Hydrogen purity, mole percent | 40 | 40 |
| Pressure, p.s.i.g | 530 | 530 |
| Charge: (lbs./hr.) | | |
| Fresh Stock | 24,925 | 32,000 |
| Recycle Stock | 26,903 | 26,000 |
| Total charge | 51,828 | 58,000 |
| Products: (lbs./hr.) | | |
| Hydrocarbon Gases ($C_1$-$C_4$) | 1,016 | 1,380 |
| Gasoline $C_5$-400° F | 7,180 | 9,200 |
| Napthalene | 13,707 | 17,200 |
| Recycle (such as through line 27) | 26,903 | 26,000 |
| Bottoms (such as from fractionator 26) | 3,002 | 3,940 |
| Alkylnaphthalenes <522° F | [2] 241 | [2] 1,650 |
| Alkylnaphthalenes 522-555° F | [2] 484 | [2] 211 |
| Acenaphthene | } 510 { | 374 |
| Alkylbiphenyls | | 121 |
| Alkylnaphthalenes 555-575° F | [2] 363 | [2] 56 |
| Alkylbiphenyls | } 57 { | 55 |
| Alkylacenaphthenes | | 22 |
| 5,6-benzindane | | 19 |
| Fluorene | 509 | 330 |
| Bottoms >575° F | 838 | 1,102 |
| Total products (lbs./hr.) | 51,808 | 57,720 |

[1] The data for each run are a combination of actual plant flow data over a 24-hour period and laboratory analytical data on samples of the Bottoms. The data have not been weight balanced but are representative of operational variations experienced. For example the substantial difference in the values of 241 and 1,650 shown for "Alkylnaphthalenes <522° F." are due to variations in plant fractionating conditions for fractionator 26 and to normal variations in the compositions of available refinery feed stocks for the process.
[2] Alkylnaphthalenes suitable for recycle to hydrodealkylation reactor.

We claim:
1. In a process wherein an aromatic concentrate derived from catalytic gas oil and boiling in the range of 430-575° F., said concentrate being substantially free of sulfur-containing compounds and containing less than 10 percent saturated hydrocarbons, is thermally hydrodealkylated to form naphthalene from alkylnaphthalenes contained in said concentrate, wherein the effluent from the hydrodealkylation zone comprises naphthalene and higher boiling aromatic material including alkylnaphthalenes, acenaphthene and fluorene, wherein said effluent is fractionated to separate naphthalene from the higher boiling aromatic material, and wherein at least a portion of the higher boiling aromatic material is recycled to the hydrodealkylation zone for further conversion to naphthalene, the steps which comprise:
   (A) subjecting said higher boiling aromatic material to fractional distillation to obtain the following three fractions:
      (1) a first fraction boiling in the range of 450-522° F.
      (2) a second fraction boiling in the range of 522-555° F.,
      (3) and a third fraction boiling in the range of 555-575° F.;
   (B) recycling said first fraction to the hydrodealkylation zone;
   (C) subjecting said second fraction to fractional crystallization to precipitate acenaphthene from a mother liquor and separately recovering the acenaphthene;
   (D) recycling said mother liquor to the hydrodealkylation zone;
   (E) subjecting said third fraction to fractional crystallization to precipitate fluorene from a second mother liquor and separately recovering the fluorene;
   (F) and recycling said second mother liquor to the hydrodealkylation zone.

2. In a process wherein an aromatic concentrate derived from catalytic gas oil and boiling in the range of 430-575° F. is hydrodealkylated to form naphthalene from alkylnaphthalenes and produce from the hydrodealkylation zone an effluent comprising naphthalene and higher boiling aromatic components including alkylnaphthalenes, acenaphthene and fluorene, said effluent is fractionated to separate naphthalene from the higher boiling aromatic material and at least a portion of the higher boiling aromatic material is recycled to the hydrodealkylation zone for further conversion to naphthalene, the steps which comprise:
   (a) fractionating said higher boiling aromatic material to separate a cut boiling mainly in the range of 522-555° F. and rich in acenaphthene;
   (b) selectively crystallizing said 522-555° F. cut to recover acenaphthene from other aromatic constituents;
   (c) and recycling said other aromatic constituents from the 522-555° F. cut to the hydrodealkylation zone.

3. In a process wherein an aromatic concentrate derived from catalytic gas oil and boiling in the range of 430-575° F. is hydrodealkylated to form naphthalene from alkylnaphthalenes and produce from the hydrodealkylation zone an effluent comprising naphthalene and higher boiling aromatic components including alkylnaphthalenes, acenaphthene and fluorene, said effluent is fractionated to separate naphthalene from the higher boiling aromatic material and at least a portion of the higher boiling aromatic material is recycled to the hydrodealkylation zone for further conversion to naphthalene, the steps which comprise:
   (a) fractionating said higher boiling aromatic material to separate a cut boiling mainly in the range of 555-575° F. and rich in fluorene;
   (b) selectively crystallizing said 555-575° F. cut to recover fluorene from associated aromatic components;
   (c) and recycling said associated aromatic components from the 555-575° F. cut to the hydrodealkylation zone.

4. In a process wherein an aromatic concentrate derived from catalytic gas oil and boiling in the range of 430-575° F. is hydrodealkylated to form naphthalene from alkylnaphthalenes and produce from the hydrodealkylation zone an effluent comprising naphthalene and higher boiling aromatic components including alkylnaphthalenes, acenaphthene and fluorene, said effluent is fractionated to separate naphthalene from the higher boiling aromatic material and at least a portion of the higher boiling aromatic material is recycled to the hydrodealkylation zone for further conversion to naphthalene, the steps which comprise:
   (a) fractionating said higher boiling aromatic material to separate a cut boiling mainly in the range of 522-555° F. and rich in acenaphthene and a second cut boiling mainly in the range of 555-575° F. and rich in fluorene;
   (b) selectively crystallizing said 522-555° F. cut to recover acenaphthene from a mother liquor comprising other aromatic constituents;
   (c) selectively crystallizing said 555-575° F. cut to recover fluorene from a second mother liquor comprising associated aromatic components;
   (d) and recycling at least one of said mother liquors to the hydrodealkylation zone.

5. Process according to claim 4 wherein both of said mother liquors are recycled to the hydrodealkylation zone.

References Cited

UNITED STATES PATENTS

| 3,197,518 | 7/1965 | Chapman et al. | 260—668 |
| 3,325,551 | 6/1967 | Suld | 260—668 |
| 2,414,118 | 1/1947 | Orchin | 260—668 |

(Other references on following page)

UNITED STATES PATENTS

| | | | |
|---|---|---|---|
| 3,145,238 | 8/1964 | Kestner | 260—672 |
| 3,150,196 | 9/1964 | Mason | 260—672 |
| 3,160,671 | 12/1964 | Feigelman et al. | 260—672 |
| 3,172,919 | 3/1965 | Hagerty et al. | 260—674 |
| 3,177,262 | 4/1965 | Calkins | 260—672 |
| 3,198,846 | 8/1965 | Kelso | 260—672 |
| 3,201,488 | 8/1965 | Sherk et al. | 260—672 |
| 3,204,006 | 8/1965 | Broughton | 260—672 |
| 3,256,357 | 6/1966 | Baumann et al. | 260—672 |
| 3,288,875 | 11/1966 | Payne et al. | 260—672 |
| 3,210,434 | 10/1965 | Chapman | 260—670 |
| 3,317,622 | 5/1967 | Hoertz et al. | 260—672 |
| 3,317,623 | 5/1967 | Green et al. | 260—672 |
| 3,390,200 | 6/1968 | Sze | 260—672 |
| 3,401,209 | 9/1968 | Majewski | 260—672 |
| 3,193,592 | 6/1965 | Eubank | 260—672 |
| 3,193,593 | 6/1965 | Eubank | 260—672 |

OTHER REFERENCES

Fowle and Pitts: "Thermal Hydrodealkylation," Chem. Eng. Progress 58(4) 37–40 (April 1962).

"Hydrodealkylation Processes," Ind. Eng. Chem., 54(2) 28–30 (February 1962).

DELBERT E. GANTZ, Primary Examiner

G. E. SCHMITKONS, Assistant Examiner

U.S. Cl. X.R.

260—668, 673.5, 674